Dec. 23, 1941.  S. M. DEL CAMP  2,267,586
FASTENER MEMBER
Filed Jan. 16, 1940
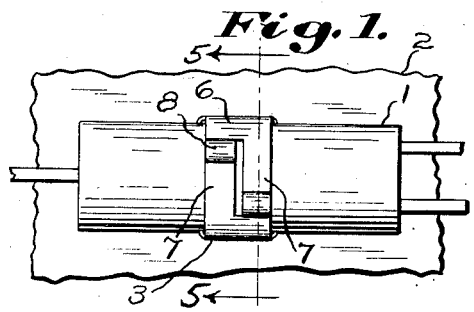
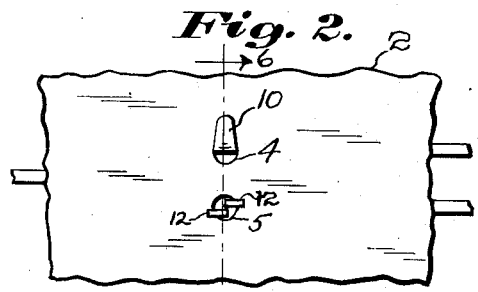
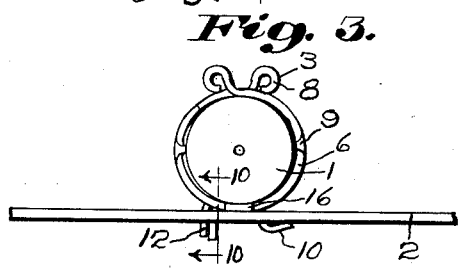
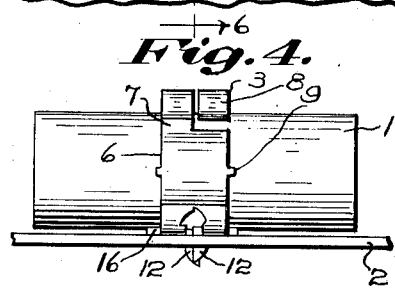
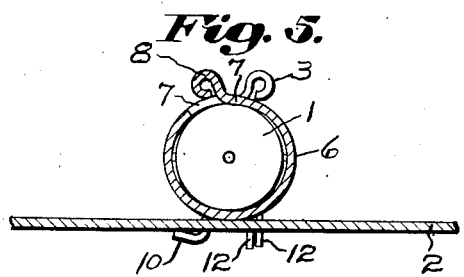
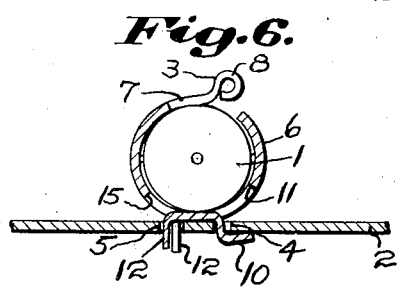
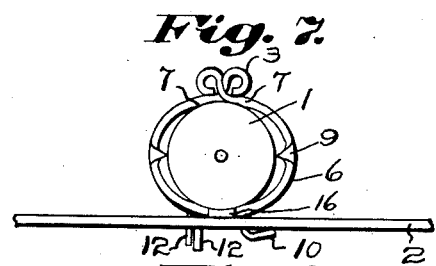
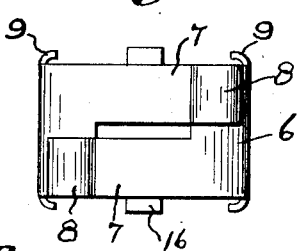
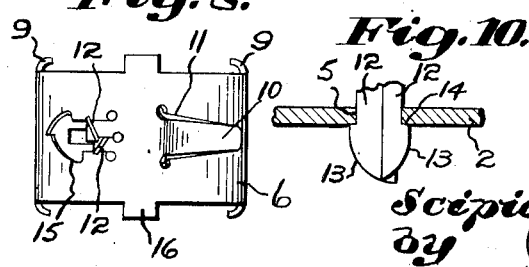
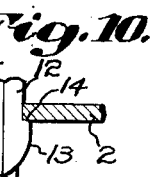
Inventor:
Scipione M. DelCamp.
by John Todd
Att'y.

Patented Dec. 23, 1941

2,267,586

UNITED STATES PATENT OFFICE 2,267,586

FASTENER MEMBER

Scipione M. Del Camp, Maywood, Ill., assignor to Cinch Manufacturing Corporation, Chicago, Ill., a corporation of Illinois Application January 16, 1940, Serial No. 314,122

7 Claims. (Cl. 24—73)

This invention relates to improvements in fastener members.

Referring to the drawing, in which I have illustrated a preferred embodiment of my invention:

Fig. 1 is a top plan view of an installation including a supporting panel and an article of manufacture secured to the panel by means of my improved fastener member;

Fig. 2 is a bottom plan view of the installation shown in Fig. 1;

Fig. 3 is an end view of the installation shown in Fig. 1;

Fig. 4 is a side view of the installation shown in Fig. 1;

Fig. 5 is a sectional view taken along the line 5—5 of Fig. 1;

Fig. 6 is a sectional view taken along the line 6—6 of Fig. 2;

Fig. 7 is an end view of an installation showing operation of the fastener to release the article;

Fig. 8 is an enlarged bottom plan view of my improved fastener member per se;

Fig. 9 is an enlarged top plan view of my improved fastener member per se; and

Fig. 10 is an enlarged sectional view along the line 10—10 of Fig. 3.

Referring to the installation illustrated in Figs. 1-7, I have shown an article of manufacture such as a tubular paper condenser 1 secured to a supporting panel 2 by means of my improved fastener member 3. The supporting panel 2, which may be the chassis of a radio set, has a pair of spaced circular openings 4 and 5 therein for receiving attaching means provided by the fastener member 3 to secure the fastener member to the panel in a manner to be described. Although I have chosen to illustrate the use of my fastener member for securing a tubular paper condenser to a panel, it is understood that the fastener is equally adaptable to receive and hold other articles of various shapes and sizes.

The fastener member 3 provides an expansible and contractible loop portion of substantially cylindrical shape and having a preformed diameter which is less than that of the tubular condenser 1. The cylindrical loop portion has a bowed body portion 6 intermediate its ends and extensions or end portions 7—7 of less width than that of the bowed body portion which are disposed in side-by-side overlapping relation. The end portions 7—7 are curved to conform substantially with the arc of the body portion 6 and combine therewith to form a substantially cylindrical portion which completely surrounds the condenser when the parts are in assembly and grips the condenser at an indeterminate number of points around its circumference. Finger operative portions in the form of small loops 8—8 are provided at the outermost ends of the end portion 7. Thus expansion of the cylindrical portion in a generally horizontal direction is quickly effected by exerting pressure on the loops 8—8 by the fingers or a suitable tool to move the loops toward each other. As a means for effecting firmer engagement between the fastener member and the part assembled therewith, I have provided a plurality of prongs 9 integral with the body portion 6 at the edges thereof and extending into alignment with the axis of the cylindrical loop portion to dig into the condenser under the natural tension of the loop portion to limit lateral or rotational displacement of the condenser. The prongs 9 are preferably disposed adjacent the ends of the horizontal diameter of the cylindrical portion so as to be forced apart as a result of expansion of the cylindrical portion.

As a means for securing the fastener member 3 to the panel 2, I have provided attaching portions extending from the body portion 6 for fastener engagement with the panel 2 through the openings 4 and 5. One of the attaching portions, in my preferred construction, is a foot or hook-shaped portion 10 extending downwardly beneath the body portion 6 and then outwardly. The hook-shaped portion 10 is formed entirely from within the marginal edges of the body portion 6 so as to leave an opening 11 therein. Other attaching portions are provided preferably in the form of a pair of socket-engaging portions 12—12 which extend downwardly from the body portion 6. The socket-engaging portions 12—12 are arranged in overlapping relation for scissors-like action and have narrow outer edges 13—13 (Fig. 10) diverging from the outermost end of the socket-engaging portions and then extending inwardly to form abrupt shoulders 14 for snap fastener engagement with the supporting panel 2 through the opening 5 thereof. The socket-engaging portions 12—12 are taken from material entirely within the marginal edges of the body 6 whereby an opening 15 is formed in the body portion. Ears 16 integral with opposed edges of the cylindrical portion intermediate the hook-shaped portion 10 and the socket-engaging portions 12—12 extend outwardly away from the cylindrical portion so as to engage the surface of the panel 2 and increase relative stability of the fastener member.

Assembly of the parts of my installation is preferably carried out by first attaching the fastener member 3 to the support and then moving the condenser 1 into assembly with the fastener member. In attaching the fastener to the support, the hook-shaped portion 10 is inserted through the aperture 4 so as to hook over the wall surrounding the aperture. The socket-engaging portions 12—12 are brought into alignment with the opening 5 by this action and when pressure is exerted on the fastener member in the direction of the supporting panel, the portions 12—12 are snapped into assembly with the panel 2 by a relative scissors-like action to dispose the shoulders 14—14 behind the panel. It will be noticed that the hook-shaped portion 10 is preferably inclined toward the cylindrical portion and yieldable to take up variations in the thicknesses of relatively thin supporting panels or to be spread slightly away from the cylindrical portion at its free end to engage over a relatively thicker panel. The fastener member is now rigidly fixed to the panel but may be detached therefrom if it should be desired by reversing the above-mentioned operation. Prior to assembling the condenser 1 with the fastener member, the loop portions 8—8 are moved toward each other either by the fingers of an operator or by a suitable tool thereby elongating the loop portion so that the diameter of the same through opposed prongs 9—9 is greater than the diameter of the condenser 1. The condenser is now moved axially into the cylindrical loop portion to a desired position, after which the loops 8—8 are released whereupon the cylindrical loop portion automatically contracts causing the prongs 9 to dig into the condenser slightly so as to prevent displacement of the same.

Thus it will be seen that by my improved fastener member the condenser may be quickly detached for purpose of servicing and then replaced. Also, the condenser may be moved laterally relative to the fastener member to any desired position and the fastener is capable of gripping and holding the condenser at any point along its length. Also, the fastener member is adaptable, as a result of its inherent resiliency, to receive and grip tubular parts of varying diameters.

Although I have illustrated and described a preferred embodiment of my invention, I do not wish to be limited thereby because the scope of my invention is best defined by the following claims.

I claim:

1. A fastener member formed from one piece of sheet metal and comprising an article-gripping portion and a pair of integral attaching portions extending beyond one side of said article-gripping portion, one of said attaching portions being in the form of a hook for hooking engagement with a supporting structure through an aperture, and the other of said attaching portions having a yieldable shouldered portion for snapping engagement through an aperture in said supporting structure to hold said hook in place, and said attaching portions being taken from material within the marginal edges of said article-gripping portion.

2. A fastener member formed from one piece of sheet metal and comprising an expansible and contractible loop portion of cylindrical shape adapted to surround and grip an article, said loop portion having free ends at one side thereof, and an integral attaching portion extending from said loop portion at a side thereof opposite said free ends for engagement with a support through an aperture thereof to secure said fastener to said support.

3. A fastener member formed from one piece of sheet metal, said fastener being in the form of an expansible and contractible loop of cylindrical shape adapted to receive and grip an article, said fastener member having a bowed body portion intermediate its ends and end portions disposed in overlapping relation, each of said end portions having a finger operative means for expanding said loop on movement of said means toward each other, and an integral attaching portion extending from said body portion for engagement with a support through an aperture thereof to secure said fastener to said support.

4. A fastener member formed from one piece of sheet metal, said fastener being in the form of an expansible and contractible loop of cylindrical shape adapted to receive and grip an article, said fastener member having a bowed body portion intermediate its ends and end portions disposed in overlapping side-by-side relation, each of said end portions having a finger operative means for expanding said loop on movement of said means toward each other and a pair of integral attaching portions extending from said body portion, one of said attaching portions being in the form of a hook for hooking engagement with a supporting structure through an aperture, and the other of said attaching portions having a yieldable shouldered portion for snapping engagement through an aperture in said supporting structure to hold said hook in place, and said attaching portions being taken from material within the marginal edges of said bowed body portion.

5. A fastener member formed from one piece of sheet metal and comprising an expansible and contractible loop portion adapted to receive and grip an article, and a pair of integral attaching portions extending from said loop portion, one of said attaching portions being in the form of a hook for hooking engagement with a supporting structure through an aperture, and the other of said attaching portions comprising a pair of yieldable snap fastener portions adapted to snap through an aperture in said supporting structure.

6. A fastener member formed from one piece of sheet metal and comprising an expansible and contractible loop portion adapted to receive and grip an article, and a pair of integral attaching portions extending from said loop portion, one of said attaching portions being in the form of a hook for hooking engagement with a supporting structure through an aperture, and the other of said attaching portions comprising a pair of yieldable snap fastener portions adapted to snap through an aperture in said supporting structure, said hook portion having a sloping end portion to permit yielding thereof and permit a take-up action of said shouldered portion for the purpose described.

7. A fastener member, formed from one piece of sheet metal and comprising an article-gripping portion and a pair of integral attaching portions extending beyond one side of said article-gripping portion, one of said attaching portions being in the form of a hook for hooking engagement with a supporting structure through an aperture, and the other of said attaching portions comprising a pair of yieldable fingers adapted to move toward and away from each other and each having a portion shaped to cooperate and provide a stud head and neck.

SCIPIONE M. DEL CAMP.